Figure 1:
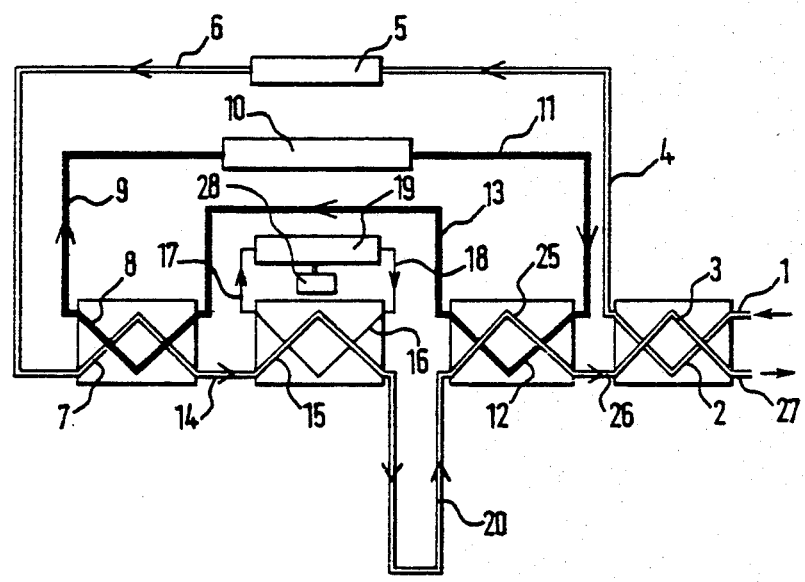

United States Patent [19]

Hasting

[11] Patent Number: 4,534,986
[45] Date of Patent: Aug. 13, 1985

[54] HIGH-TEMPERATURE TREATMENT OF LIQUIDS

[75] Inventor: Anthony P. M. Hasting, Crawley, England

[73] Assignee: APV International Limited, England

[21] Appl. No.: 558,968

[22] Filed: Dec. 7, 1983

[30] Foreign Application Priority Data

Dec. 8, 1982 [GB] United Kingdom ............... 8234987

[51] Int. Cl.³ .............................................. A23L 3/22
[52] U.S. Cl. ................................... 426/521; 165/66; 426/522; 426/599
[58] Field of Search ............... 426/522, 521, 599, 520; 165/66

[56] References Cited

U.S. PATENT DOCUMENTS

| | | | |
|---|---|---|---|
| 2,170,402 | 8/1939 | Faust | 165/66 |
| 2,472,998 | 6/1949 | Ziegler | 165/66 |
| 3,010,832 | 11/1961 | Dahlstedt | 165/66 |
| 3,296,122 | 1/1967 | Karassik et al. | 165/66 |
| 3,382,917 | 5/1968 | Rice | 165/39 |
| 3,567,470 | 3/1971 | McElroy | 426/522 |

Primary Examiner—George Yeung
Attorney, Agent, or Firm—Hamilton, Brook, Smith & Reynolds

[57] ABSTRACT

The invention is concerned with the ultra-high temperature treatment of liquids, such as milk, with a minimum of thermal damage. The present invention provides a method and apparatus for indirect ultra-high temperature treatment of a liquid in which the flow rate of a liquid through a holding tube (20) is capable of being varied and in which the holding temperature of the liquid is selected between the characteristic holding temperature for that liquid and a temperature above the said characteristic holding temperature by a temperature control means (28).

The invention provides a method and apparatus for ultra-high temperature treatment which reduces the thermal damage to a product when variable plant throughputs are employed.

8 Claims, 1 Drawing Figure

HIGH-TEMPERATURE TREATMENT OF LIQUIDS

This invention is concerned with the ultra-high temperature treatment of liquids, such as milk, with a minimum of thermal damage.

The microbiological degradation of foodstuffs may be prevented or reduced by two processes: chilling and freezing or thermal sterilization. Extended chilling and freezing are generally uneconomical and may be unsuccessful with certain psychrophilic micro-organisms; for example, the milk colonizing *Pseudomonas fragi*. Thermal sterilization, to an aseptic product, is therefore desirable. Unfortunately thermal sterilization can damage heat-sensitive components and the constraints which this places on plant design, limit the throughput range.

The aim of the present invention is to improve an "ultra-high-temperature" treatment (hereafter known as a UHT treatment) for the sterilization of liquids with a heat-sensitive component, such that the increases in thermal damage caused by operating the plant at reduced capacities are minimised. The method and apparatus are applicable to a range of liquids, for example, milk, fruit juices, yeast and meat extracts, vegetable oils and chemical preparations.

During UHT treatment two effects may be considered as occurring simultaneously; the sterilizing effect, and a thermochemical effect which results in the thermal damage. Both effects are increased by an increase in the length of the "holding time", that being the period for which the liquid is maintained at the sterilizing or "holding" temperature.

Two types of UHT treatment have been practised. Firstly there is a direct treatment, in which steam is injected directly into the liquid. Secondly, there is an indirect treatment in which some form of heat-exchanger is used, to elevate the particular liquid being sterilized to a temperature hereafter referred to as the "characteristic holding temperature".

After UHT treatment it has been common practise to package the sterile product aseptically. The major problem with UHT treatment plants arises here: the aseptic filling machinery may require a different flow rate of sterile product for different package volumes. For example, the aseptic filler may have the facility to fill pack sizes of 1 liter, 0.5 liter, and 0.25 liter. Under these circumstances the UHT plant will be required to operate with a range of throughputs.

A previously known solution to the problem of obtaining a good product with a variable throughput, has been to run a UHT plant intermittently at full throughput and use a sterile buffer tank, between the UHT plant and the aseptic filler. This is an expensive solution, adding complexity to plant cleaning operations. It has not been possible to reduce the flow rate through the UHT treatment plant without affecting the quality of the product.

The assessment of the sterilising effect and thermal damage caused by a UHT process employs the system parameters: At (overall thermal damage) and Fo (overall sterilising effect). For example, in a known plant, operating at a characteristic holding temperature of 138° C., a turndown to one quarter of the throughput increases Fo from 8.3 to 34.3 (arbitary units) and increases At from 8860 to 36,020 (arbitary units). The effect of turndown is seen to be severe and may lead to an unsatisfactory product.

According to the present invention there is provided a method of indirect ultra-high-temperature treatment of a liquid susceptible to thermal damage and having a variable flow rate, in which the liquid must be held at a holding temperature at or above a characteristic holding temperature for the liquid for a period of time, the improvement comprising; determining a temperature above the characteristic holding temperature for the liquid and varying the holding temperature of the liquid between the characteristic holding temperature and the temperature above the characteristic holding temperature for reducing the holding temperature of the liquid as the flow rate of the liquid falls.

If the sterilising method employs a higher temperature than is conventional and a suitably shortened holding time, then, as the flow rate of the liquid falls the increased holding time may be compensated for by reducing the holding temperature.

The increased thermal damage may therefore be minimised, whilst retaining a satisfactory sterilising effect.

According to a second aspect of the invention there is provided an apparatus for the indirect ultra-high-temperature treatment of a liquid suceptable to thermal damage and having a variable flow rate comprising means defining a flow path for the liquid, means defining a flow path for a service fluid which is in thermal contact with the liquid and means for regulation of the temperature of the service fluid, wherein the temperature of the liquid is held at or above a characteristic holding temperature for the liquid for a period of time, characterised in that the apparatus further includes means for varying the temperature of the liquid between the characteristic holding temperature for the liquid and a temperature above said characteristic holding temperature such that as the flow rate of the liquid falls the temperature of the liquid is reduced, thereby reducing the thermal damage incurred by the liquid.

In a preferred embodiment the liquid is milk and the holding temperature is varied between 138° and 140° C.

The invention will be further illustrated by example, with reference to the attached diagram in which;

FIG. 1 is a representation of a part of a UHT treatment milk sterilisation plant incorporating one embodiment of the invention.

Milk enters along line 1, at a temperature of 5° C., from milk reception or bulk milk storage and enters one set 2 of flow spaces of a first heat exchanger 2, 3. The temperature of the raw milk is raised to 74° C. by heat exchanged with the processed milk in the other set of flow spaces 3. This direct regeneration serves to conserve energy.

The preheated raw milk leaves the heat exchanger 2, 3, via outlet line 4 to a homogenizer 5. The homogenizer provides the pressure required to drive the milk through the plant to the aseptic filling plane which follows, and may also act as a flow controller.

From the homogenizer 5, the milk passes via line 6, to one set of flow spaces 7, of a regenerative heat exchanger 7, 8. The regenerative heat exchanger 7, 8 raises the temperature of the milk to 122° C. The heat required for this rise in temperature is supplied by the regenerative fluid circulating through the other set of flow spaces 8.

The regenerative circuit comprises the flow spaces 8, and return line 9, a cooler 10, a feed line 11, flow spaces 12 and a line 13. The purpose of the regenerative circuit is indirect transfer of heat from the sterilized milk to the pre-heated raw milk. The regenerative fluid at 78° C. leaves the cooler 10 along feed line 11 and enters the flow spaces 12 of the regenerative heat exchanger 12, 25 where it removes a quantity of heat sufficient to raise its temperature to 120° C. The regenerative fluid then passes via line 13 to flow spaces 8 where the majority of this quantity of heat is transferred to the pre-heated raw milk in flow spaces 7. The temperature of the regenerative fluid falls to 82° C. and it is returned along line 9 to the cooler 10, which prevents overheating. The incorporation of such a regenerator circuit, gives the UHT treatment a high thermal economy.

Line 14 carries the heated milk to one set of flow spaces 15, of the high temperature heat exchanger 15, 16. The high temperature heat exchanger 15, 16 heats the milk to a temperature of 140° C. At this temperature sterilization occurs rapidly, usually in 2 to 4 seconds.

The service fluid circuit for the high temperature heat exchanger comprises the flow spaces 16 the lines 17 and 18 and the heater 19, which also functions as a pump and flow controller. The service fluid at 142° C. leaves the heater 19 along the line 18 and passes through flow space 16 to emerge into line 17 at 124° C. returning to the heater. A temperature control means 28, is provided, to control the temperature of the service fluid in line 18.

The ratio of the flow rates of the service fluid through the flow spaces 16 to that of the liquid in flow spaces 15 is maintained substantially at unity by a flow controller which may, for example, be incorporated into the heater 19. With a flow ratio of unity, the temperature difference across the heat transfer surfaces will be constant throughout the high temperature section, and the temperature profile will be linear. A non-linear temperature profile results in increased thermal damage. Furthermore, the rate of deposition of fouling materials is a function of the temperature difference; a non-linear profile is known to enhance deposition.

The heated milk is carried by holding tube 20 at 140° C. During the milk's passage through the holding tube sterilization and thermal degradation both continue. The characteristic holding temperature, for milk is 138° C. and the holding time 4 sec. In the exemplary method following the teaching of the present invention, a holding temperature of 140° C. is employed for a holding time of 2 sec, when the plant is functioning at maximum throughput.

From the holding tube 20 the milk passes to one set of flow spaces 25, of the regenerative heat exchanger 12, 25 where the temperature is lowered to 88° C., a quantity of heat being removed by the regenerative fluid circulating through flow spaces 12.

The line 26 carries the milk from the second regenerative heat exchanger 12, 25 to one set of flow spaces 3 of the heat exchanger 2, 3. The temperature of the processed milk falls to 19° C. during its passage of flow spaces 3 as heat is exchanged with the cold milk in the other set of flow spaces 2.

The line 27 carries the processed milk to an aseptic packing plant.

In milk thermal damage can occur at temperature above 80° C., with partial dephosphorylation of casein and denaturation of serum proteins. The dephosphorylation of caseins leads to the disruption of micells, while the denaturation of serum proteins, such as lactoglobulin, can release votile sulphur compounds such as hydrogen sulphide and certain mercaptans. Both these effects will taint the flavour of the milk. However, the UHT treatment temperatures the milk must remain above a temperature of 135° C. for at least two seconds if they are to destroy heat resistance bacterial spores, thermoduric bacteria, thermoduric moulds and other resistant organisms such as the leptospira. If the temperature time profile for the UHT treatment process is known, then the sterilizing effect and the thermal damage may be calculated, it should be noted that the regenerative section contributes to these factors. The choice of time/temperature combination is a compromise for a given plant operating at its design capacity.

A typical turndown ratio for a plant may be 4 to 1. This would reduce the quality of the product considerably, as the flow rate would mean a longer effective residence time in the holding tube and accompanying thermal damage.

In this embodiment turndown is accompanied by a reduction in the temperature of the service fluid in line 18, under the control of temperature control means 28. This reduces the amount of heat transferred from flow space 16 to flow space 15 and reduces the temperature of the milk in the holding tube 20. The temperature of the milk in the holding tube is reduced from 140° C. to 138° C. for the typical turndown ratio of 4 to 1. The reduction in temperature thus compensates or the increase in holding time which occurs with the lower flow rate.

Monitoring of the system may be accomplished by sensors (not shown) and by a microprocessor control system (not shown), acting through the control means 28.

Although this example is illustrated by reference to a UHT treatment plant for milk, the invention may also be applied in other cases where the thermal sterilization of thermo-degradable fluid is desired.

For example, the characteristic holding temperature for a fruit juice with acidity below pH 4.6 is 90° C. for a holding time of 30 seconds. As a further example, the characteristic holding temperature for fruit juice of medium acidity, such as tomato juice, would be 120° C. for 45 seconds.

The temperature above the characteristic holding temperature at which the plant operates with a full throughput is determined by parameters of the plant such as the flow space cross-section and other particular constructional details. The length of the holding tube is determined in a similar manner.

I claim:

1. In a method of indirect ultrahigh temperature treatment of a liquid susceptible to thermal damage and having a variable flow rate, in which the liquid must be held at a holding temperature at or above a first holding temperature for a first period of time by which sufficient overall sterilizing effect is obtained with minimal overall thermal damage while flowing at a first flow rate, the improvement comprising determining a higher, second temperature above the first holding temperature and a corresponding higher, second flow rate for the liquid to hold the liquid at that higher temperature for a lesser second period of time to provide sufficient overall sterilizing effect with minimal overall thermal damage, varying the flow rate of the liquid between the first flow rate and the second flow rate, and varying the holding temperature of the liquid between the first holding temperature and the second temperature by means of a heating fluid in indirect counterflow heat exchange relationship with the treated liquid while the flow rate of the liquid is varied between the first flow rate and the second flow rate to maintain sufficient overall sterilizing effect with minimal overall thermal damage while varying throughput of the liquid.

2. A method as claimed in claim 1, in which the liquid is milk.

3. A method as claimed in claim 2, in which the first holding temperature is 138° C. and in which the upper limit of the holding temperature is 140° C.

4. A method as claimed in claim 1, in which the liquid is a fruit juice of pH less than 4.6.

5. A method as claimed in claim 4 in which the first holding temperature is 90° C.

6. A method as claimed in claim 1, in which the liquid is a fruit juice.

7. A method as claimed in claim 6, in which the first holding temperature is 120° C.

8. In a method of indirect ultrahigh temperature treatment of a liquid susceptible to thermal damage and having a variable flow rate, in which the liquid must be held at a holding temperature at or above a first holding temperature for a first period of time by which sufficient overall sterilizing effect is obtained with minimal overall thermal damage while flowing at a first flow rate, the improvement comprising determining a higher, second temperature above the first holding temperature and a corresponding higher, second flow rate for the liquid to hold the liquid at that higher temperature for a lesser second period of time to provide sufficient overall sterilizing effect with minimal overall thermal damage, varying the flow rate of the liquid between the first flow rate and the second flow rate, and varying the temperature and flow rate of a heating fluid, in indirect counterflow heat exchange relationship with the treated liquid, to vary the holding temperature of the liquid between the first holding temperature and the second temperature while the flow rate of the liquid is varied between the first flow rate and the second flow rate to maintain sufficient overall sterilizing effect with minimal overall thermal damage while varying throughput of the liquid.

* * * * *